US005807623A

United States Patent [19]

Chess

[11] Patent Number: 5,807,623

[45] Date of Patent: Sep. 15, 1998

[54] INTEGRAL LABEL WITH CARBONLESS COATING

[75] Inventor: Stanley C. Chess, Goffstown, N.H.

[73] Assignee: Moore Business Forms, Inc., Grand Island, N.Y.

[21] Appl. No.: 550,962

[22] Filed: Oct. 31, 1995

[51] Int. Cl.[6] ..... B32B 3/00

[52] U.S. Cl. ..... 428/195; 428/422; 428/77; 428/137; 428/488.4; 428/500; 503/200; 283/81; 283/101

[58] Field of Search ..... 428/195, 264, 428/411.1, 488.4, 913, 974, 688, 42.2, 77, 177, 500; 283/82, 81, 101; 503/200

[56] References Cited

U.S. PATENT DOCUMENTS

| | | | |
|---|---|---|---|
| 2,990,081 | 7/1961 | de Neul et al. . | |
| 3,926,113 | 12/1975 | Steidinger . | |
| 4,110,502 | 8/1978 | Baer . | |
| 4,379,573 | 4/1983 | Lomeli et al. . | |
| 4,664,416 | 5/1987 | Steidinger . | |
| 4,799,712 | 1/1989 | Biava et al. . | |
| 4,821,439 | 4/1989 | Wilck . | |
| 4,854,610 | 8/1989 | Kwistek . | |
| 4,890,862 | 1/1990 | Buchholz . | |
| 4,910,058 | 3/1990 | Jameson . | |
| 4,978,415 | 12/1990 | Jones . | |
| 4,983,438 | 1/1991 | Jameson . | |
| 5,011,559 | 4/1991 | Felix . | |
| 5,031,938 | 7/1991 | Instance . | |
| 5,061,334 | 10/1991 | Paules . | |
| 5,098,759 | 3/1992 | Felix . | |
| 5,129,682 | 7/1992 | Ashby . | |
| 5,203,851 | 4/1993 | Browning et al. . | |
| 5,209,698 | 5/1993 | Dolan | 462/17 |
| 5,324,153 | 6/1994 | Chess . | |
| 5,482,328 | 1/1996 | Stewart | 283/81 |
| 5,525,569 | 6/1996 | Chess | 503/200 |

OTHER PUBLICATIONS

"Stencil and Pressure Label Applicator" brochure, Tamarack (4 pages). 1989.

Scotch® Vacuum Wheel Applicator, 3M (4 pages). undated.

"Displays, Plakate, Fotos, Posters" brochure in German language (6 pages). undated.

*Primary Examiner*—William Krynski

*Attorney, Agent, or Firm*—Nixon & Vanderhye P.C.

[57] ABSTRACT

A transfer tape for making an integral label having dual-release liners and a carbonless coating on a face of the first liner. The tape also has a first silicone coating on a second face of the first liner and a pressure-sensitive adhesive on the first silicone coating. The second release liner is also provided with a silicone coating having a different affinity for the adhesive than does the first silicone coating. The transfer tape may be in a roll with the adhesive engaging the second silicone coating. The first silicone coating may be a differential coating and applied at a weight of about 3–10 grams per square meter. The adhesive may be a hot melt or acrylic adhesive. A business form may be constructed of a face stock and a patch of the transfer tape, the transfer tape pressure sensitive adhesive engaging the face stock. The labels may be die cut out of the business form. A CB coating is provided on the first face of the first liner and the transfer tape patch is applied to the face stock so as to overlie a CF coating on a second substrate stock.

11 Claims, 3 Drawing Sheets

*Fig. 3*
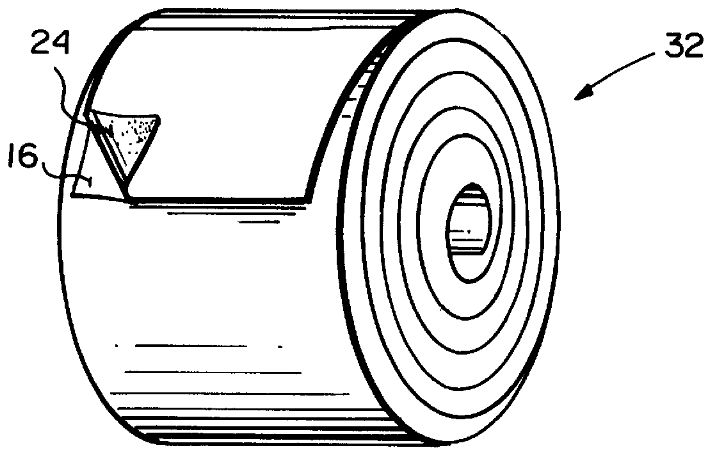
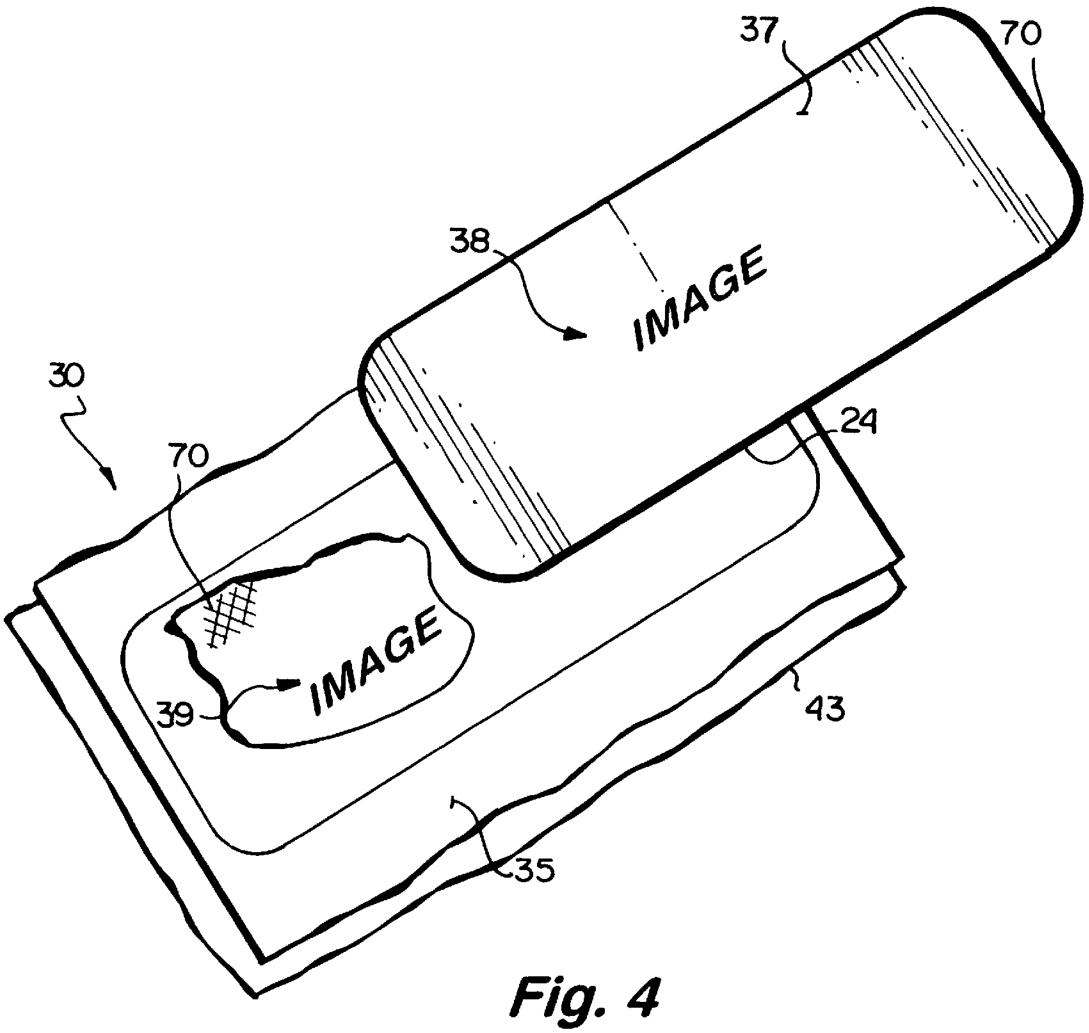
*Fig. 4*

INTEGRAL LABEL WITH CARBONLESS COATING

BACKGROUND AND SUMMARY OF THE INVENTION

Transfer tape is becoming increasingly common in the manufacture of business forms or the like. For example, commonly assigned U.S. Pat. No. 5,324,153 (the disclosure of which is hereby incorporated by reference herein) shows a business form having an integral label, where the label is constructed by applying a patch of transfer tape to the back of paper stock, and the label is die cut from an area of the stock that is covered by the transfer tape patch. The current invention relates to an improvement in the transfer tapes used to make integral labels and the methods employed to make integral labels with transfer tape. In particular, the invention relates to a liner feature of transfer tapes used for making integral labels with carbonless coatings.

This invention relates to a transfer tape having a carbonless coating or coated back (CB), and first and second release liners. In addition, the transfer tape with first and second release liners includes a layer or coating liner that allows for an image printed on the label to transfer through the transfer tape patch to an adjacent paper substrate to create a record copy of the printed label.

According to a first aspect of the present invention, a transfer tape with first and second release liners is provided with a CB coated liner. A carbonless chemical coated-back (CB) is applied to a first face of the first release liner. A silicone coating is applied over a second face of the first release liner and a pressure sensitive adhesive coating is applied over the silicone coating. A second release liner also has a face coated with silicone, which coating is in adhesive contact with the adhesive coating. The silicone coating on the second liner has a greater adhesive release tendency than does the silicon on the first liner, so that when the two liners are pulled apart the adhesive (having a greater affinity for the first liner) will remain with the first liner. The CB coating on the first (primary) liner allows for an image to be copied onto a substrate having a coated-front (CF) coating beneath the transfer tape.

The invention also comprises a business form having an integral label. The form may comprise a face stock and a transfer tape, where the transfer tape pressure sensitive adhesive adheres to the face stock. Labels may be die cut out of the face stock and removed, as described in U.S. Pat. No. 5,324,153. A CF coated substrate sheet may be provided underneath the transfer tape, if a CB coating is provided on the uncoated side (opposite to the adhesive) of the primary liner.

Another aspect of the invention is a method of making an imaging integral label from transfer tape having first and second release liners. The method comprises the steps of: (a) providing a supply of transfer tape having first and second release liners, (b) applying a CB coating over one side of the second liner, (c) dispensing the transfer tape, (d) removing the first release liner from the transfer tape to expose a pressure sensitive adhesive coating of the tape, (e) applying a section or patch of the transfer tape to a substrate by applying the exposed pressure sensitive adhesive coating to a first substrate, (f) forming a label in either the first substrate or applied section of the transfer tape, and (g) juxtaposing the CB coated section of tape adjacent a CF coated second substrate.

It is the primary object of the present invention to provide a transfer tape having two release liners for use in making integral labels, with an associated CB image coating that is constructed in a simple straight-forward manner, and that can be utilized in the construction of a business form with imaging labels. This and other objects of the invention will become clear from an inspection of the detailed description of the invention and from the appended claims.

BRIEF DESCRIPTION OF THE DRAWINGS

FIG. 3 is a perspective schematic view of an exemplary roll of transfer tape according to the present invention;

FIG. 4 is a perspective exploded view showing a label and record copy produced from a business form utilizing the teachings of the present invention;

DETAILED DESCRIPTION OF THE DRAWINGS

Figure 1:
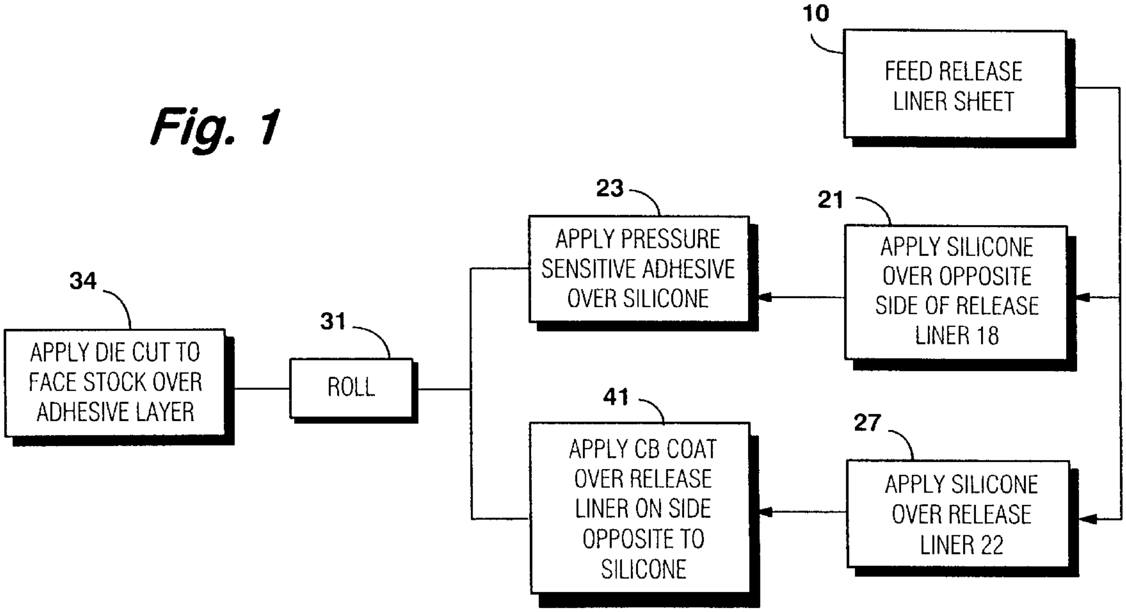
FIG. 1 is a schematic view showing exemplary methods of producing transfer tape and a business form according to the present invention.

FIG. 1 schematically illustrates various procedures for production of transfer tapes, and for a business form utilizing transfer tape, according to the present invention. The procedure is started by feeding a pair of release liner webs, as illustrated generally by box 10. The release liner webs are shown generally by reference numerals 11 and 16 in FIG. 2. In addition, primary release liner 11 may comprise a base 13 of paper stock with a silicone coating 22 thereon, and having a first face 14 and a second face 15.

The primary liner 11 is preferably made from a 21–25 pound paper substrate (but may be a film or foil) and is preferably 1.5 to 2.5 millimeters in thickness. The secondary liner 16 is usually a thicker material made preferably from a 30–50 pound paper stock with a thickness of 3–4 millimeters. The thinner liner material 11 is used to make the integral label, rather than the thicker liner 16 which has a primary purpose of support. The primary liner is thin so as to minimize any increase or effect on the bulk or character of the resulting business form.

The dual-release liner transfer tape may be provided in a roll configuration (such as shown in FIG. 3). A wide variety of different types of materials and weights of material may be provided and applied in different manners. The silicone coatings are typically provided at a weight of about 3–10 grams per square meter, with five $gm/m^3$ being approximately optimum. Typically a differential coating of silicone is applied to the transfer tape release liners. That is, one of the silicone coatings has a stronger affinity for adhesive than the other silicone coating, and each of these differential coatings engages the pressure sensitive adhesive.

To the first face 14 of the primary release liner and a first face 17 of the secondary release liner are applied coatings or film layers of silicone, as shown generally by reference numerals 21 and 27 in FIG. 1. The silicone coatings are illustrated schematically at 22 and 18 in FIG. 2, and preferably comprises a differential coating of silicone, that is one having a stronger affinity for adhesive than the other. For instance a 4–5 differential silicone may be applied with the "4" side in contact with the first face 14 and with the "5" side in contact with face 17, since the "5" side has less affinity for the adhesive than the "4" side.

To the silicone coating 18 of the secondary web liner (or to the coating 22 of the primary liner 11), the pressure sensitive adhesive is applied, as illustrated schematically at 23 in FIG. 1. The pressure sensitive adhesive—shown schematically at 24 in FIG. 2—may be of any suitable type, either permanent, repositional, removable, or the like. A common way for applying the adhesive 24 in the step 23 is as a hot melt glue, such as with a cross web acrylic glue. The hot melt adhesive is applied with a ribbon coater to the silicone coating 18 or 22 so that the adhesive 24 adheres to the primary liner 11 due to the differential silicone coatings once the primary and secondary webs are separated. The tape from the pre-wound tape can be used as the second release liner 16 for the transfer tape 30. The second release liner 16 is also applied to form the transfer tape 30. As does the primary release liner 11, the second release liner 16 has a silicone coating 18 that covers a first face 17 of the second release liner. The pair of release liners 11, 16 form a protective sandwich covering both sides of the adhesive 24. The transfer tape 30 (absent the CB coating 28) is a conventional product generally known commercially as dual-release liner transfer tape.

To the first face 14 of the primary release liner sheet, a silicone coating 22 (FIG. 2) is applied, as illustrated schematically at 27 in FIG. 1. The silicone coating 22 on the primary release liner sheet, and the silicone coat 18 on the second release liner sheet 16, are preferably applied so that they have a weight of about 3–10 grams per square meter.

Figure 5:
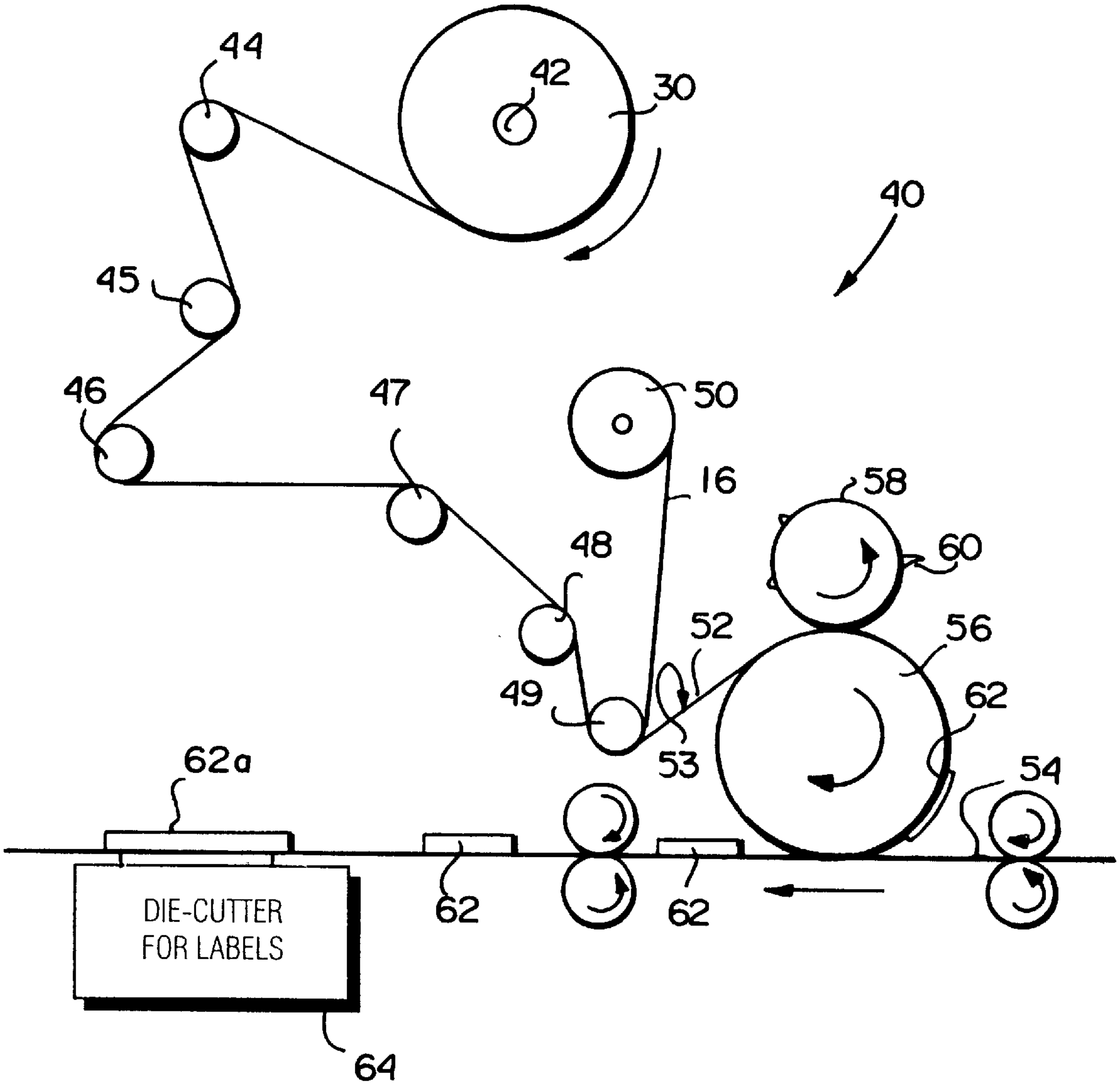
FIG. 5 is a view showing an apparatus for making an integral label formed from double-linered transfer tape.

According to the invention, a conventional CB coating 28 is applied to a second face 15 of the primary release liner 11. This is illustrated schematically at 41 in FIG. 1, the CB coating being shown at 28 in FIG. 2. When a CB coated 28 transfer patch 62 (FIG. 5); is juxtaposed over a CF coating 142 on an adjacent sheet 143, an image printed on the integral label is transferred onto the CF-coated sheet 143. A transfer tape patch is a segment of transfer tape from which the secondary liner has been removed to expose the adhesive. The patch is applied to a web sheet 54 underneath label area of the sheet, such as shown in FIG. 5. If desired, additional CB and/or CF coated sheets 142'/143' can be added (via a collating unit) one under the other. In this manner, several record copies may be made of a printed label.

Similarly, additional integral labels may also be incorporated into the multi-ply form so that several labels may be created on the same multi-ply form. For example, a transfer tape patch 162 which adheres to the underside of another integral label 164 that is die-cut 165 into the sheet 143. The patch has a CB coating 145 juxtaposed to the CF coating 163 of the underlying sheet 143. With this dual-label configuration, an image transferred from a first label (see FIG. 4) will transfer partially to a second label 164 of the first record sheet 143 and partially to a non-label section of the sheet. Similarly, the image could also transfer to a second or third record sheets 142'/143' by virtue of the CB coatings 145, 147 on the backs of the transfer tape patch 162 and the sheet 143, respectfully.

Figure 2:
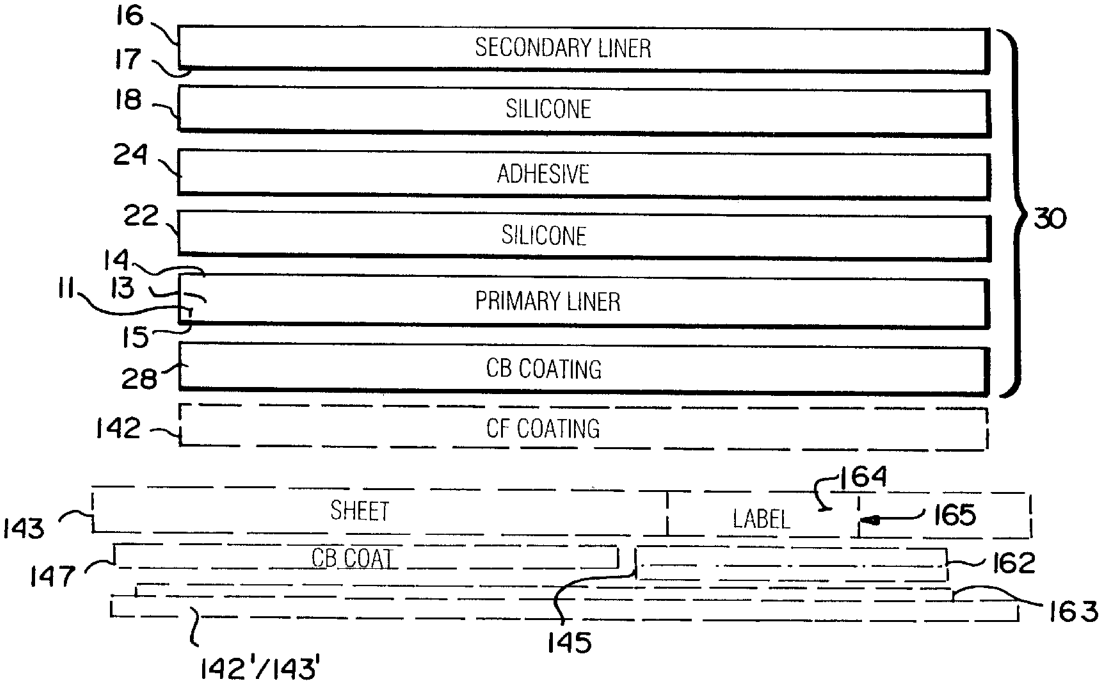
FIG. 2 is a side exploded view, with the components greatly exaggerated in thickness for clarity of illustration, of a piece of transfer tape according to the present invention, with a face stock and a CF sheet also shown in association therewith.

Once the transfer tape is constructed—the transfer tape being shown schematically at reference numeral 30 in FIG. 2—it may be wound into a roll configuration, as illustrated schematically at 31 in FIG. 1. The roll configuration itself is illustrated schematically at 32 in FIG. 3. Alternatively, the transfer tape 30 may be run in lengths and automatically cut into those lengths, or may be cut into small segments, e.g., patches, to be applied as liner backed labels. In FIG. 1 the stage illustrated schematically at 34 indicates applying the transfer tape in lengths to face stock, the face stock being shown schematically at 35 in FIG. 4, to form business forms such as shown in U.S. Pat. No. 5,129,682. The face stock 35 is die cut to form individual labels, as illustrated schematically at 37 in FIG. 4.

FIG. 4 schematically illustrates a label 37 formed from the face stock 35 which will have the pressure sensitive adhesive 24 on the bottom face thereof, and shows it with an image 38 imprinted thereon. That image 38 is also transferred—as indicated by reference numeral 39 in FIG. 4—to a second substrate sheet 43 underlying remaining transfer tape 30, provided that a CF-coating 70 is applied to the face of the underlying sheet 43. For illustrative purposes, an imaginary hole is shown in FIG. 4 through the transfer tape liner to show the image on the underlying sheet. A CB coating 28 is applied to the back-side of the primary liner 11 which is occupied by the area of the label 37. This arrangement effects the transfer of an image to the underlying record sheet 43 (see FIG. 2).

FIG. 5 illustrates a method by which the dual-liner transfer tape is applied to a form substrate in making an integral label. A label applicator 40 includes a shaft 42 rotatably supporting a roll of transfer tape 30 having a primary and second release liner sandwiching an adhesive coating. The transfer tape is unrolled and advanced by rollers 44, 45, 46, 47, 48 and 49, some of which drivingly engage the tape to unroll and advance the tape. Because the adhesive is sandwiched between the release liners, the adhesive of the transfer tape does not adhere to the rollers. After passing over the last roller 49, the second release liner 16 is peeled off and removed from the remaining transfer tape 52 (i.e., the primary release liner 11 and adhesive coating 24), and the second release liner is wound on roll 50. As the second release liner is peeled away, the adhesive coating of the transfer tape, or primary liner 11, is exposed. To avoid having the adhesive stick to the label applicator, the adhesive-coated side 53 of the exposed transfer tape 52 is kept out of contact with other surfaces on the label applicator, other than a die-cutting blade 60. The die-cutting blade may be coated with a silicon lubricant to avoid sticking to the adhesive. The adhesive coated side 53 of the transfer tape 52 does not touch any surface, until the tape is applied to a web substrate 54, where the adhesive adheres to the substrate.

After the second release liner is peeled off, the non-adhesive coated side of the exposed transfer tape is brought into suction contact with a vacuum cylinder 56 that serves as an anvil surface to a die-cutting cylinder 58 having a cutting blade(s) 60 for cutting the exposed transfer tape into segments 62, e.g., patches. The vacuum cylinder rotates such that its surface speed is faster than the tape speed to separate the tape segments 62 on the surface of the cylinder. The rotation of the vacuum cylinder also brings the tape segments 62 into contact with the web substrate 54. The adhesive on the tape segments adheres to the web to attach the tape segments to the web at a predetermined location on the substrate. A conventional label die-cutter 64 can be used to cut the substrate in an area below the tape segment **62*a*** to form an integral label. A suitable label applicator with a die-cut unit is sold by the Tamarack Products, Inc., of Wauconda, Ill.

It will thus be seen that according to the present invention a CB coated transfer tape, business form constructed thereby, and method of construction thereof, have been provided which are simple yet effective. The invention has been shown and described in what is presently conceived to be its most practical and preferred embodiment. It will be apparent to those of ordinary skill in the art that many modifications may be made to the invention that are within the scope of the invention, which scope is to be accorded the broadest interpretation of the appended claims so as to encompass all equivalent structures and methods.

What is claimed is:

1. An integral label comprising:

a label substrate die cut from a form substrate;

a transfer tape patch comprising a release liner patch coated with a pressure sensitive adhesive coating, said adhesive coating adhering the release liner to a first side of the label substrate;

a coated-back (CB) coating on an adhesive-free side of the release liner patch, wherein said adhesive-free side is substantially free of any coating other than the CB coating, and wherein said adhesive-free side is adapted to bear against a coated-front (CF) coating on a second form substrate underlying the form substrate.

2. An integral label as in claim 1 wherein the second substrate has a side, opposite to the side with the CF coating, which has a CB coating that is adapted to bear against a coated-front (CF) coating on a third substrate underlying the second substrate.

3. An integral label as in claim 1 further comprising a removable second release liner having a silicone coated side in adhesive contact with the adhesive coating of the release liner patch, and wherein the second release liner is removed from the release liner patch before the patch is applied to the form substrate.

4. A carbonless transfer tape for making integral labels comprising:

a first release liner material having first and second faces;

a second release liner material having first and second faces;

a coated-back (CB) coating applied to said first face of said first release liner;

a first silicone coating applied to the second face of said first release liner;

a second silicone coating applied to one of said first and second faces of said second release liner;

a layer of pressure sensitive adhesive applied to only one of said first or second silicone coatings; and wherein the other of said first and second silicone coatings is brought into contact with said pressure sensitive adhesive so that said pressure sensitive adhesive is sandwiched between the first and second release liners to form a temporary laminate.

5. A carbonless transfer tape for making integral labels as provided in claim 4, wherein said first and second silicon coatings have a different affinity for said pressure sensitive adhesive.

6. A carbonless transfer tape for making integral labels as provided in claim 5, wherein the affinity of the silicon coating on said first release liner is greater than the affinity of the silicone coating on the second release liner.

7. A carbonless transfer tape for making integral labels as provided in claim 4, wherein said pressure sensitive adhesive is a hot melt adhesive.

8. A carbonless transfer tape for making integral labels as provided in claim 4, wherein said pressure sensitive adhesive is an acrylic adhesive.

9. A carbonless transfer tape for making integral labels as provided in claim 4, wherein said first release liner material is made from a 21–25 pound stock and has a thickness of 1.5 to 2.5 millimeters.

10. A carbonless transfer tape for making integral labels as provided in claim 4, wherein said second release liner material is made from a 30 to 50 pound stock and has a thickness of 3 to 4 millimeters.

11. An integral label on a form substrate as provided in claim 1, wherein said release liner forming said transfer tape patch is of a thickness smaller than a thickness of the form substrate.

* * * * *